United States Patent [19]

Li

[11] Patent Number: 5,741,374

[45] Date of Patent: Apr. 21, 1998

[54] HIGH STRENGTH, DUCTILE, CO-FE-C SOFT MAGNETIC ALLOY

[75] Inventor: Lin Li, Reading, Pa.

[73] Assignee: CRS Holdings, Inc., Wilmington, Del.

[21] Appl. No.: 856,456

[22] Filed: May 14, 1997

[51] Int. Cl.$^6$ ............................................. C23C 8/22
[52] U.S. Cl. ................................. 148/319; 148/311
[58] Field of Search ............................. 148/311, 319

[56] References Cited

U.S. PATENT DOCUMENTS

| | | | |
|---|---|---|---|
| 1,338,133 | 4/1920 | Honda | 148/311 |
| 3,891,475 | 6/1975 | Tomita et al. | 148/311 |
| 3,977,919 | 8/1976 | Foster et al. | 148/121 |
| 4,116,727 | 9/1978 | Major . | |
| 4,933,026 | 6/1990 | Rawlings et al. | 148/311 |
| 5,067,993 | 11/1991 | Wakita et al. | 148/311 |
| 5,501,747 | 3/1996 | Masteller et al. | 148/311 |

FOREIGN PATENT DOCUMENTS 0441341  8/1974  U.S.S.R. ..................... 148/311

OTHER PUBLICATIONS

Hiperco® Alloy 27, Carpenter Technology Corporation Alloy Data Sheet, Aug. 1995.

T. Nishizawa et al., "The Co–Fe (Cobalt–Iron) System", Bulletin of Alloy Phase Diagrams, vol. 5, No. 3, 1984.

*Primary Examiner*—John Sheehan
*Attorney, Agent, or Firm*—Dann, Dorfman, Herrell and Skillman, P.C.

[57] ABSTRACT

A magnetically soft, Co—Fe—C alloy is disclosed which contains in weight percent, about

| | |
|---|---|
| Carbon | 0.05–0.50 |
| Manganese | 0.5 max. |
| Silicon | 0.5 max. |
| Phosphorus | 0.01 max. |
| Sulfur | 0.01 max. |
| Chromium | 1.0 max. |
| Nickel | 1.0 max. |
| Molybdenum | 0.25 max. |
| Cobalt | 14–28 |
| Vanadium | 0.1 max. |
| Niobium | 0.1 max. |
| Tungsten | 0.1 max. | and the balance is essentially iron. The alloy provides a yield strength of up to about 580 MPa (84 ksi) while maintaining ductility and magnetic induction comparable to the known 27Co—Fe soft magnetic alloy. Magnetic and mechanical properties are developed through an annealing heat treatment which is performed after the alloy has been mechanically worked and machined to final shape.

20 Claims, 1 Drawing Sheet

HIGH STRENGTH, DUCTILE, CO-FE-C SOFT MAGNETIC ALLOY

FIELD OF THE INVENTION

This invention relates to soft magnetic alloys and in particular to an cobalt-iron-carbon (Co—Fe—C) alloy that provides a unique combination of yield strength, ductility, and magnetic induction in the annealed condition.

BACKGROUND OF THE INVENTION

Magnetic bearings are being used more frequently in high speed and high power rotating devices such as compressors and generators used in aircraft. Magnetic bearings are a preferred replacement for ball bearings because they provide extremely low rotational friction and are capable of being operated at very high rotational speeds, e.g., >50,000 rpm. Furthermore, magnetic bearings are inherently safer than ball bearings because they do not require lubricating oils. Such lubricants can ignite when the rotating device is operated in an elevated temperature environment.

An alloy having a nominal composition of 49% cobalt, 2% vanadium, balance iron and an alloy having a nominal composition of 49% cobalt, 0.35%, tantalum, balance iron, have been used to make strip that is fabricated into laminations for the rotors used in magnetic bearings. However, other components of magnetic bearings have relatively larger cross-sections, such as thrust-beating disks, journals, and rotor shafts. Those parts must be forged from bulk material which provides not only good soft magnetic properties, e.g., high magnetic induction and low coercivity, but also good forgeability and ductility. Despite their good magnetic properties, the known alloys containing equal amounts of cobalt and iron, with or without one or more additional elements, are at a nearly fully ordered state after annealing and, therefore, are relatively brittle at room temperature. That shortcoming renders them undesirable for use in making large cross-sectional parts.

A known Co—Fe alloy has the following nominal composition in weight percent.

|  | wt. % |
|---|---|
| Carbon | 0.01 |
| Manganese | 0.25 |
| Silicon | 0.25 |
| Nickel | 0.60 |
| Cobalt | 27.00 |
| Chromium | 0.60 |
| Iron | Bal. |

That alloy is sold as HIPERCO® Alloy 27. The alloy provides good forgeability and has a high saturation induction and good ductility in the as-forged condition. The alloy is not readily transformed into the ordered state at room temperature. However, its room temperature yield strength, which is in the range of 240–380 MPa (34.8–55.1 ksi) is considered to be too low for magnetic bearing applications.

In the absence of a soft magnetic alloy having suitably high yield strength and ductility, magnetic bearing designers have been limited to choosing alloy steels or maraging steels for the larger cross-section parts. While such steels provide good yield strength, their magnetic properties leave much to be desired. Because of their relatively low magnetic induction, magnetic bearing parts made from such alloys must contain a relatively larger amount of material, thereby increasing the weight of the magnetic bearings. Such excessive weight is particularly undesirable for devices used in aircraft.

SUMMARY OF THE INVENTION

In accordance with one aspect of the present invention there is provided a soft magnetic alloy having the following broad, intermediate, and preferred weight percent compositions:

|  | Broad | Intermediate | Preferred A | Preferred B |
|---|---|---|---|---|
| C | 0.05–0.50 | 0.1–0.25 | 0.05–0.50 | 0.05–0.50 |
| Mn | 0.5 max. | 0.5 max. | 0.5 max. | 0.5 max. |
| Si | 0.5 max. | 0.5 max. | 0.5 max. | 0.5 max. |
| P | 0.01 max. | 0.01 max. | 0.01 max. | 0.01 max. |
| S | 0.01 max. | 0.01 max. | 0.01 max. | 0.01 max. |
| Cr | 1.0 max. | 0.8 max. | 0.8 max. | 0.8 max. |
| Ni | 1.0 max. | 0.8 max. | 0.8 max. | 0.8 max. |
| Mo | 0.25 max. | 0.25 max. | 0.25 max. | 0.25 max. |
| Co | 14–28 | 15–27 | 22–28 | 14–20 |
| V | 0.1 max. | 0.1 max. | 0.1 max. | 0.1 max. |
| Nb | 0.1 max. | 0.1 max. | 0.1 max. | 0.1 max. |
| W | 0.1 max. | 0.1 max. | 0.1 max. | 0.1 max. |

The balance is essentially iron and the usual impurities found in the same or similar grades of such alloys.

In accordance with another aspect of this invention there is provided a magnetic article which is formed of a magnetic alloy containing in weight percent about 0.02% max. carbon, 0.5% max. manganese, 0.5% silicon, 1.0% max. chromium, 1.0% max. nickel, 0.25% max. molybdenum, 14–28% cobalt, 0.1% max. vanadium, 0.1% max. niobium, 0.1% max. tungsten, and the balance essentially iron. The magnetic article includes a carburized case layer that contains 0.05–0.50% carbon.

Here and throughout this application, the term "percent" or "%" means percent by weight, unless otherwise indicated.

BRIEF DESCRIPTION OF THE DRAWINGS

Further novel features and advantages of the present invention will become apparent from the following detailed description and the accompanying drawings in which.

DETAILED DESCRIPTION

Figure 1:
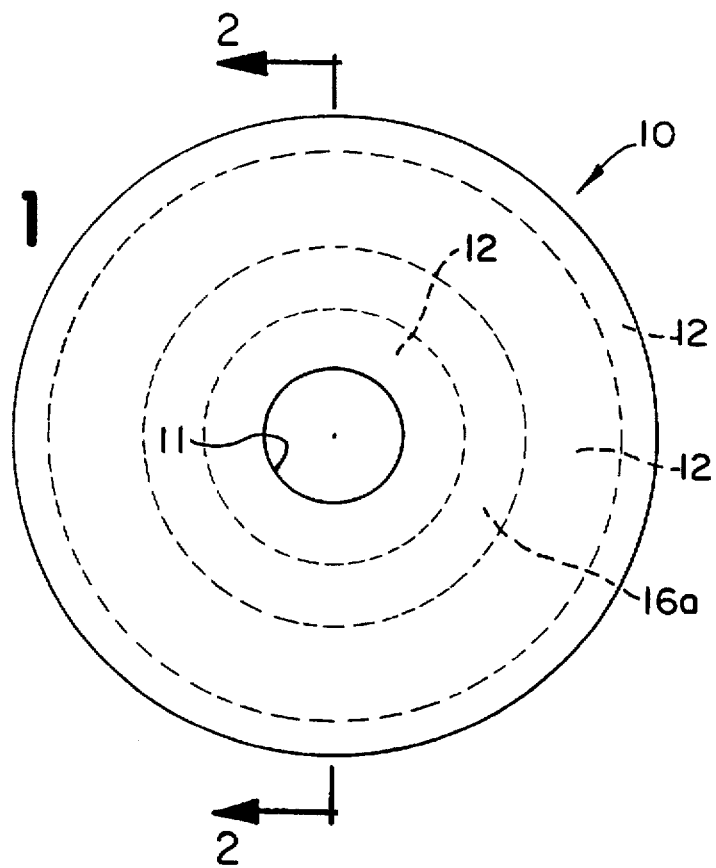
FIG. 1 is an elevation view of a thrust-bearing disk according to the present invention.

The alloy according to this invention contains at least about 0.05%, preferably at least about 0.1% carbon to benefit the strength of the alloy primarily through a solid solution strengthening effect. Too much carbon adversely affects the ductility of the alloy and its magnetic induction, particularly in low magnetic fields. Therefore, carbon is limited to not more than about 0.5%, and preferably to not more than about 0.25%. For the best combination of yield strength and magnetic properties, the alloy contains about 0.22–0.24% carbon.

At least about 14%, better yet at least about 15%, and preferably at least about 22% cobalt is present in this alloy because it contributes to the good magnetic induction provided by the alloy. Cobalt also benefits the yield strength of the alloy. For aeronautical applications where weight is a critical factor, at least about 24% cobalt is preferred in order to obtain a high ratio of magnetic flux density to weight. Although the magnetic saturation induction of the alloy is better with larger mounts of cobalt, the magnetic induction at lower magnetic fields, e.g., 30 Oe, does not vary significantly as the amount of cobalt is increased. Therefore, about 14–20% cobalt provides an acceptable combination of yield strength and magnetic induction for land-based uses where weight is not a significant factor.

The presence of too much cobalt in this alloy results in at least partial ordering which adversely affects the room temperature toughness of the alloy. To obtain the best combination of magnetic properties, toughness, strength, and ductility, the alloy contains not more than about 28%, and preferably not more than about 27% cobalt.

Additional elements may be present in controlled amounts to benefit other desirable properties provided by this alloy. For example, small amounts of manganese and silicon can be retained in the alloy from deoxidizing additions. When present, manganese and silicon are restricted to not more than about 0.5% each in this alloy. Up to about 1.0% each of chromium and nickel can be present in the alloy to benefit the resistivity of the alloy. Up to about 0.1% each of vanadium, niobium, and/or tungsten can be present in this alloy for grain refinement which benefits the alloy's ductility and contributes to maintaining good magnetic properties. However, the amounts of vanadium, niobium, and tungsten should be controlled to avoid the excessive formation of carbides which can adversely affect the magnetic properties provided by this alloy. A limited amount of molybdenum, up to about 0.25% can be present in the alloy to form carbides which restrain grain growth when the alloy is exposed to elevated temperatures, such as during an annealing heat treatment. Although a small amount of carbides can be beneficial to restrain grain growth, an excessive amount of such carbides is not desired in the present alloy.

The balance of the alloy is essentially iron apart from the usual impurities found in commercial grades of alloys intended for similar service or use. The levels of such elements are controlled so as not to adversely affect the desired properties. In this regard, phosphorus and sulfur are restricted to not more than about 0.01% each because those elements adversely affect the hot workability of the alloy. Titanium and aluminum are restricted to not more than about 0.05% each because they adversely affect the soft magnetic properties provided by this alloy.

The alloy according to the present invention is prepared, worked, and formed into products using conventional techniques. It can be melted in air as by means of an electric arc furnace or, preferably, it can be melted using well-known vacuum melting techniques such as vacuum induction melting (VIM). When desired, higher purity or better grain structure can be obtained by refining the alloy for example by electroslag remelting (ESR) or vacuum arc remelting (VAR).

After being melted and cast, the alloy is hot worked into forms such as billets, bars, or slabs from a furnace temperature of about 1065°–1232° C. (1950°–2250° F.). Those forms are machined into useful parts and components, such as disks, journals, and shafts for magnetic bearings. Alternatively, after hot working to the intermediate form, the alloy may be cold worked to forms such as strip or wire which are then processed into useful components. To develop the desired combination of mechanical and magnetic properties, parts made from this alloy are annealed after final machining. The annealing heat treatment is carried out at a temperature of about 704.4°–815.5° C. (1300°–1500° F.), preferably at about 732.2°–787.8° C. (1350°–1450° F.), for about 2 hours. For best results, the alloy is annealed at about 760° C. (1400° F.). The alloy is cooled from the annealing temperature at a rate of about 83.3–833.3C°/h (150–1500F°/h), preferably about 100–722.2C°/h (180–1300F°/h). For best results, the alloy is cooled at about 100C°/h (180F°/h).

In an alternative embodiment of the present invention a part or component made from a soft magnetic alloy having the following weight percent composition is prepared as just described:

0.02% max. carbon,
0.5% max. manganese,
0.5% silicon,
1.0% max. chromium,
1.0% max. nickel,
0.25% max. molybdenum,
14–28% cobalt,
0.1% max. vanadium,
0.1% max. niobium,
0.1% max. tungsten,
Balance iron Prior to the final annealing step, the alloy form undergoes a carburizing heat treatment to provide a carburized case-layer having a weight percent range for carbon of about 0.05 to 0.5%, preferably about 0.1 to 0.25% carbon. This carburized case layer is preferably formed in the surface of the part and particularly in the vicinity of the part surface which will experience the maximum mount of stress when the part is used in service. After the carburizing treatment, the carburized article is annealed as set forth above. The annealed article provides the unique combination of yield strength and magnetic properties in the carburized layer that are characteristic of the alloy according to the present invention. In addition, the non-carburized core of the article retains the good toughness, ductility, and magnetic properties of the known alloy although at the lower strength level. This is advantageous because the article according to this invention can provide optimum magnetic properties while also providing the desired higher strength in the carburized surface layer.

Figure 2:
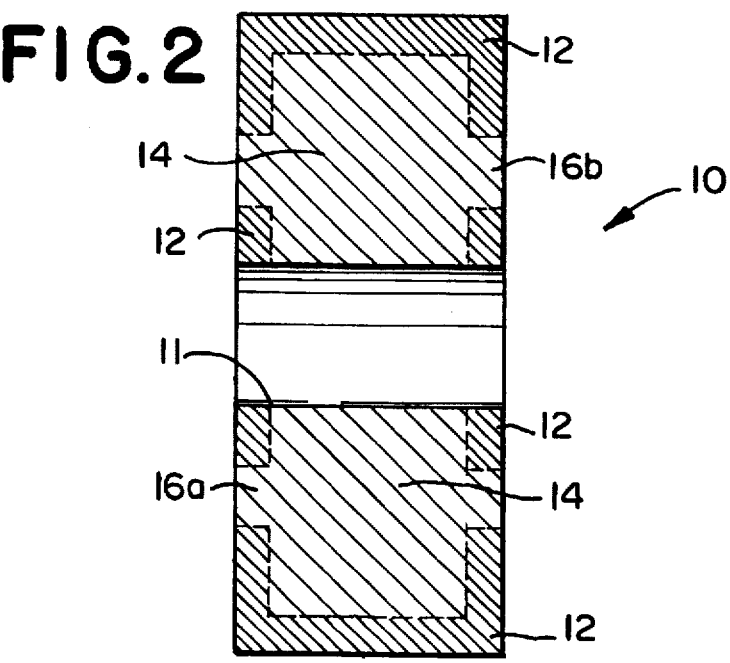
FIG. 2 is a cross-sectional, side elevation of the thrust-bearing disk of FIG. 1 as viewed along line 2—2 therein.

Shown in FIGS. 1 and 2 is an article in accordance with the present invention in the form of a thrust-bearing disk 10 for a magnetic bearing. The disk 10 is formed of the $Co_{27}Fe$ alloy set forth above and has a central opening 11 by which it is attached to the shaft of the magnetic bearing. Disk 10 includes a surface layer 12 that has been selectively carburized as described hereinabove and a core portion 14 that retains the basic composition of the $Co_{27}Fe$ alloy. The surface layer 12 is carburized to the extent that the surface carburized surface layer 12 has a weight percent composition in accordance with the Co—Fe—C described in this application. By virtue of its composition, the carburized surface layer 12 has significantly higher strength than the core portion 14, but the core portion 14 retains the good magnetic properties of the $Co_{27}Fe$ alloy. Core portion 14 has annular surface regions 16a, 16b that are formed to be directly in line with the flux path of the applied magnetic field that provides the thrust-countering force for the magnetic bearing. When the magnetic bearing is in operation, the disk 10 experiences large stresses that result from the very high rotational speed of the magnetic bearing. The higher strength of the selectively carburized layer 12 enables disk 10 to better resist deformation from the imposed stresses and the optimal magnetic properties of the core portion 14 result in good magnetic performance.

TABLE 1

| Elmt. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| C | 0.054 | 0.113 | 0.165 | 0.165 | 0.165 | 0.166 | 0.168 | 0.179 | 0.220 |
| Mn | 0.25 | 0.25 | 0.26 | 0.26 | 0.26 | 0.26 | 0.24 | 0.26 | 0.26 |
| Si | 0.24 | 0.24 | 0.23 | 0.23 | 0.23 | 0.23 | 0.24 | 0.24 | 0.23 |
| P | <0.005 | <0.005 | <0.005 | <0.005 | <0.005 | <0.005 | <0.005 | <0.005 | <0.005 |
| S | <0.0005 | 0.0006 | <0.001 | <0.001 | <0.001 | <0.001 | <0.0005 | <0.001 | <0.001 |
| Cr | 0.59 | 0.60 | 0.59 | 0.59 | 0.70 | 0.59 | 0.60 | 0.60 | 0.69 |
| Ni | 0.59 | 0.59 | 0.56 | 0.57 | 0.59 | 0.58 | 0.59 | 0.58 | 0.60 |
| Mo | <0.01 | <0.01 | <0.01 | <0.01 | <0.01 | <0.01 | <0.01 | <0.01 | <0.01 |
| Cu | <0.01 | <0.01 | <0.01 | <0.01 | <0.01 | <0.01 | <0.01 | <0.01 | <0.01 |
| Co | 27.33 | 27.33 | 15.00 | 19.96 | 24.01 | 26.67 | 27.36 | 26.69 | 24.04 |
| Fe | Bal. | Bal. | Bal. | Bal. | Bal. | Bal. | Bal. | Bal. | Bal. |

| Elmt. | Ex. 10 | Ex. 11 | Ex. 12 | Ex. A | Ex. B | Ex. C | Ex. D | Ex. E |
|---|---|---|---|---|---|---|---|---|
| C | 0.220 | 0.225 | 0.29 | <0.009 | 0.005 | 0.57 | 0.87 | 1.18 |
| Mn | 0.26 | 0.25 | 0.27 | 0.28 | 0.26 | 0.27 | 0.28 | 0.28 |
| Si | 0.23 | 0.24 | 0.26 | 0.25 | 0.23 | 0.26 | 0.27 | 0.27 |
| P | <0.005 | <0.005 | <0.005 | 0.002 | <0.005 | <0.005 | <0.005 | <0.005 |
| S | <0.001 | <0.0005 | 0.0009 | 0.002 | <0.001 | <0.0005 | <0.0005 | <0.0005 |
| Cr | 0.70 | 0.59 | 0.61 | 0.59 | 0.70 | 0.61 | 0.60 | 0.60 |
| Ni | 0.60 | 0.59 | 0.59 | 0.53 | 0.60 | 0.59 | 0.60 | 0.60 |
| Mo | <0.01 | <0.01 | <0.01 | 0.01 | <0.01 | <0.01 | <0.01 | <0.01 |
| Cu | <0.01 | <0.01 | <0.01 | 0.02 | <0.01 | <0.01 | <0.01 | <0.01 |
| Co | 27.00 | 27.35 | 27.50 | 27.37 | 23.95 | 27.57 | 27.62 | 27.72 |
| Fe | Bal. | Bal. | Bal. | Bal.* | Bal. | Bal. | Bal. | Bal. |

*Bal. includes 0.02% Cu, 0.005% Al, <0.005% Ti, 0.01% Nb, and <0.10% V.

EXAMPLES

In order to demonstrate the unique combination of properties provided by the alloy according to the present invention, Examples 1 to 12 having the weight percent compositions shown in Table 1 were prepared. For comparison purposes, comparative Examples A to E with compositions outside the range of the present invention were also prepared. Their weight percent compositions are also included in Table 1. Example A is representative of the HIPERCO® Alloy 27.

Each of Examples 1 to 12 and A to E were prepared as 14.5 kg (32 lb) heats that were vacuum induction melted and then cast into four 5.7 cm (2.25 in) ingots. The ingots were forged after preheating to 1204.4° C. (2200° F.) to 1.9 cm×6.35 cm (0.75 in×2.5 in) slabs. Standard specimens for tensile testing were machined from the slabs. Also, rings having a 3.8 cm (1.5 in) O.D. and 3.175 cm (1.25 in) I.D. were machined from the slabs for magnetic testing. The test specimens of each example were heat treated in dry hydrogen in accordance with each of the annealing heat treatments set forth in Table 2 below.

TABLE 2

| ID | Heat Treatment |
|---|---|
| A | 800° C. (1472° F.) for 2 h; cool at 722.2 C.° (1300 F.°) per h |
| B | 760° C. (1400° F.) for 2 h; cool at 722.2 C.° (1300 F.°) per h |
| C | 760° C. (1400° F.) for 2 h; cool at 100 C.° (180 F.°) per h |
| D | 730° C. (1346° F.) for 2 h; cool at 722.2 C.° (1300 F.°) per h |

The results of room temperature tensile testing of Examples 1 to 12 and A to E are set forth in Table 3 including the 0.2% offset yield strength (0.2% Y.S.) in MPa (ksi) and the percent elongation in four diameters (%El.). Examples 1, 12, A, C, D, and E were not tested in the "A" heat treated condition. Examples 12, A, C, D, and E were not tested in the "C" or "D" heat treated condition.

TABLE 3

| Ht. Trtmt. | Ex. | % C | % Co | 0.2% Y.S. | % El. |
|---|---|---|---|---|---|
| A | 2 | 0.113 | 27 | 502.1 (72.8)* | 25.1 |
|   | 3 | 0.165 | 15 | 382 (55.4) | 33.6 |
|   | 4 | 0.165 | 20 | 406 (58.9) | 28.1 |
|   | 5 | 0.165 | 24 | 465.4 (67.5) | 26.4 |
|   | 6 | 0.166 | 27 | 510 (74.0)* | 25.7 |
|   | 7 | 0.168 | 27 | 491.6 (71.3)* | 23.7 |
|   | 8 | 0.179 | 27 | 462.6 (67.1) | 25.4 |
|   | 9 | 0.220 | 24 | 489.5 (71.0) | 25.2 |
|   | 10 | 0.220 | 27 | 528 (76.6) | 22.6 |
|   | 11 | 0.225 | 27 | 519 (75.3) | 22.9 |
|   | B | 0.005 | 24 | 340 (49.3) | 35.7 |
| B | 1 | 0.054 | 27 | 468 (67.9)* | 27.1 |
|   | 2 | 0.113 | 27 | 546 (79.2)* | 24.7 |
|   | 3 | 0.165 | 15 | 372 (54.0) | 32.4 |
|   | 4 | 0.165 | 20 | 424 (61.5) | 29.9 |
|   | 5 | 0.165 | 24 | 457 (66.3)* | 25.0 |
|   | 6 | 0.166 | 27 | 468 (67.9) | 24.9 |
|   | 7 | 0.168 | 27 | 505.4 (73.3) | 23.1 |
|   | 8 | 0.179 | 27 | 513 (74.4)* | 23.7 |
|   | 9 | 0.220 | 24 | 527 (76.4) | 25.1 |
|   | 10 | 0.220 | 27 | 534 (77.5) | 22.1 |
|   | 11 | 0.225 | 27 | 513 (74.4) | 23.7 |
|   | 12 | 0.29 | 27 | 507 (73.5) | 21.3 |
|   | A | <0.009 | 27 | 375 (54.4) | 31.3 |
|   | B | 0.005 | 24 | 372 (54.0) | 32.4 |
|   | C | 0.57 | 27 | 609 (88.3) | 3.1 |
|   | D | 0.87 | 27 | 498 (72.2) | 9.4 |
|   | E | 1.18 | 27 | 501 (72.7) | 10.2 |
| C | 1 | 0.054 | 27 | 478.5 (69.4)* | 22.2 |
|   | 2 | 0.113 | 27 | 522 (75.7)* | 23.2 |
|   | 3 | 0.165 | 15 | 370 (53.7) | 34.2 |
|   | 4 | 0.165 | 20 | 396.4 (57.5) | 28.9 |
|   | 5 | 0.165 | 24 | 495 (71.8) | 25.8 |
|   | 6 | 0.166 | 27 | 479 (69.5) | 25.1 |
|   | 7 | 0.168 | 27 | 541 (78.5)* | 21.3 |
|   | 8 | 0.179 | 27 | 498 (72.2)* | 25.3 |
|   | 9 | 0.220 | 24 | 504 (73.1) | 24.5 |
|   | 10 | 0.220 | 27 | 543 (78.8) | 22.8 |
|   | 11 | 0.225 | 27 | 578 (83.8) | 21.6 |
|   | B | 0.005 | 24 | 342.7 (49.7) | 34.4 |
| D | 1 | 0.054 | 27 | 511.6 (74.2)* | 25.4 |

TABLE 3-continued

| Ht. Trtmt. | Ex. | % C | % Co | 0.2% Y.S. | % El. |
|---|---|---|---|---|---|
| | 2 | 0.113 | 27 | 491.6 (71.3)* | 25.8 |
| | 3 | 0.165 | 15 | 360.6 (52.3) | 32.1 |
| | 4 | 0.165 | 20 | 456.4 (66.2) | 30.5 |
| | 5 | 0.165 | 24 | 516.4 (74.9) | 27.7 |
| | 6 | 0.166 | 27 | 454.4 (65.9)* | 24.4 |
| | 7 | 0.168 | 27 | 553 (80.2)* | 23.1 |
| | 8 | 0.179 | 27 | 513 (74.4) | 23.8 |
| | 9 | 0.220 | 24 | 553 (80.2) | 24.8 |
| | 10 | 0.220 | 27 | 569.5 (82.6) | 21.6 |
| | 11 | 0.225 | 27 | 578.5 (83.9) | 21.6 |
| | B | 0.005 | 24 | 331 (48.0) | 34.2 |

*Specimen fractured outside the gage area.

The magnetic testing specimens of each of the examples were annealed at 760° C. (1400° F.) for 2 h and then cooled at 722.2C° (1300F°) per h, except Example B which was annealed at 900° (1652° F.) for 2 h and then cooled at 100C° (180F°) per h. in order to obtain the best magnetic properties as a reference with which to compare the other examples. Shown in Table 4 below are the magnetic inductions ($B_x$) in kilogauss (kG) measured at field strengths of 30 Oe, 50 Oe, 100 Oe, 150 Oe, and 200 Oe.

TABLE 4

| Ex. ID | % C | % Co | $B_{30}$ | $B_{50}$ | $B_{100}$ | $B_{150}$ | $B_{200}$ |
|---|---|---|---|---|---|---|---|
| 1 | 0.054 | 27 | 17.5 | 19.5 | 20.9 | 22.0 | 22.5 |
| 2 | 0.113 | 27 | 16.9 | 18.8 | 20.6 | 21.8 | 22.2 |
| 3 | 0.165 | 15 | 16.5 | 17.5 | 19.0 | 19.9 | 20.4 |
| 4 | 0.165 | 20 | 16.5 | 17.7 | 19.3 | 20.4 | 20.8 |
| 5 | 0.165 | 24 | 16.7 | 18.0 | 19.8 | 20.8 | 21.2 |
| 6 | 0.166 | 27 | 16.3 | 18.0 | 19.8 | 21.0 | 21.4 |
| 7 | 0.168 | 27 | 16.9 | 18.5 | 20.7 | 21.6 | 22.1 |
| 8 | 0.179 | 27 | 16.8 | 18.1 | 20.0 | 21.2 | 21.6 |
| 9 | 0.220 | 24 | 15.7 | 17.4 | 19.4 | 20.5 | 20.9 |
| 10 | 0.220 | 27 | 15.5 | 17.6 | 19.7 | 20.7 | 21.1 |
| 11 | 0.225 | 27 | 14.8 | 17.4 | 20.0 | 21.2 | 21.5 |
| 12 | 0.290 | 27 | 14.8 | 17.5 | 20.7 | 22.0 | 22.6 |
| A | <0.009 | 27 | 18.1 | 19.2 | 20.9 | 22.0 | 22.5 |
| B | 0.005 | 24 | 17.9 | 18.9 | 20.4 | 21.4 | 21.9 |
| C | 0.57 | 27 | 10.6 | 14.1 | 18.0 | 19.7 | 20.5 |
| D | 0.87 | 27 | 10.6 | 13.9 | 17.4 | 19.0 | 20.0 |
| E | 1.18 | 27 | 9.3 | 13.0 | 17.0 | 18.8 | 19.7 |

The data presented in Table 3 show that Examples 2, 6 to 8, and 10 to 12 provide superior yield strength without a significant loss in ductility relative to Example A in the "B" heat treated condition. The data in Table 4 show that Examples 2, 6 to 8, and 10 to 12 provide magnetic inductions that are comparable to Example A even though those examples were annealed at less-than-optimum conditions. Examples 4, 5, and 9 provide superior strength relative to Example B at the same level of cobalt, while maintaining acceptable ductility and magnetic induction values. The low cobalt example, Example 3, provides essentially the same strength and ductility as Examples A and B and magnetic induction that is similar to the higher Co-containing examples at low magnetic fields (e.g., 30 to 50 Oe). It is worthwhile to note that all of Examples 1 to 12 exceed the ASTM standard for magnetic induction (ASTM A801) for HIPERCO® Alloy 27 forged product. The high carbon examples, Examples C, D, and E, did not have significantly higher strength and provided relatively poor ductility and unacceptable magnetic induction, particularly at low magnetic field strengths.

The terms and expressions which have been employed herein are used as terms of description, not of limitation. There is no intention in the use of such terms and expressions of excluding any equivalents of the features shown and described or portions thereof. However, it is recognized that various modifications are possible within the scope of the invention claimed.

What is claimed is:

1. A magnetically soft alloy that provides a unique combination of strength, ductility, and magnetic induction consisting essentially of, in weight percent, about

| Carbon | 0.05–0.50 |
|---|---|
| Manganese | 0.5 max. |
| Silicon | 0.5 max. |
| Phosphorus | 0.01 max. |
| Sulfur | 0.01 max. |
| Chromium | 1.0 max. |
| Nickel | 1.0 max. |
| Molybdenum | 0.25 max. |
| Cobalt | 14–28 |
| Vanadium | 0.1 max. |
| Niobium | 0.1 max. |
| Tungsten | 0.1 max. | and the balance is essentially iron.

2. An alloy as set forth in claim 1 which contains at least about 0.1% carbon.

3. An alloy as set forth in claim 1 which contains not more than about 0.25% carbon.

4. An alloy as set forth in claim 1 which contains at least about 22% cobalt.

5. A magnetically soft alloy that provides a unique combination of strength, ductility, and magnetic induction, consisting essentially of, in weight percent, about

| Carbon | 0.1–0.5 |
|---|---|
| Manganese | 0.5 max. |
| Silicon | 0.5 max. |
| Phosphorus | 0.01 max. |
| Sulfur | 0.01 max. |
| Chromium | 0.8 max. |
| Nickel | 0.8 max. |
| Molybdenum | 0.25 max. |
| Cobalt | 15–27 |
| Vanadium | 0.1 max. |
| Niobium | 0.1 max. |
| Tungsten | 0.1 max. | and the balance is essentially iron.

6. An alloy as set forth in claim 5 which contains at least about 0.15% carbon.

7. An alloy as set forth in claim 5 which contains not more than about 0.25% carbon.

8. An alloy as set forth in claim 5 which contains at least about 22% cobalt.

9. A magnetically soft alloy that provides a unique combination of strength, ductility, and magnetic induction, consisting essentially of, in weight percent

| Carbon | 0.05–0.50 |
|---|---|
| Manganese | 0.5 max. |
| Silicon | 0.5 max. |
| Phosphorus | 0.01 max. |
| Sulfur | 0.01 max. |
| Chromium | 0.8 max. |
| Nickel | 0.8 max. |
| Molybdenum | 0.25 max. |
| Cobalt | 22–28 |
| Vanadium | 0.1 max. |
| Niobium | 0.1 max. |

-continued

| | |
|---|---|
| Tungsten | 0.1 max. | and the balance is essentially iron.

10. An alloy as set forth in claim 9 which contains at least about 0.1% carbon.

11. An alloy as set forth in claim 9 which contains not more than about 0.25% carbon.

12. An alloy as set forth in claim 9 which contains at least about 24% cobalt.

13. A magnetically soft alloy that provides a unique combination of strength, ductility, and magnetic induction, consisting essentially of, in weight percent

| | |
|---|---|
| Carbon | 0.05–0.50 |
| Manganese | 0.5 max. |
| Silicon | 0.5 max. |
| Phosphorus | 0.01 max. |
| Sulfur | 0.01 max. |
| Chromium | 0.8 max. |
| Nickel | 0.8 max. |
| Molybdenum | 0.25 max. |
| Cobalt | 14–20 |
| Vanadium | 0.1 max. |
| Niobium | 0.1 max. |
| Tungsten | 0.1 max. | and the balance is essentially iron.

14. An alloy as set forth in claim 13 which contains at least about 0.1% carbon.

15. An alloy as set forth in claim 13 which contains not more than about 0.25% carbon.

16. An alloy as set forth in claim 9 which contains at least about 15% cobalt.

17. A magnetically soft alloy article that provides a unique combination of yield strength, ductility, and magnetic induction in the annealed condition comprising:

a core formed of a magnetically soft alloy consisting essentially of, in weight percent, about

| | |
|---|---|
| Carbon | 0.05 |
| Manganese | 0.5 max. |
| Silicon | 0.5 max. |
| Phosphorus | 0.01 max. |
| Sulfur | 0.01 max. |
| Chromium | 1.0 max. |
| Nickel | 1.0 max. |
| Molybdenum | 0.25 max. |
| Cobalt | 14–28 |
| Vanadium | 0.1 max. |
| Niobium | 0.1 max. |
| Tungsten | 0.1 max. |
| Iron | Balance | and a carburized case layer containing about 0.1 to 0.50% carbon.

18. An alloy article as set forth in claim 17 wherein the core is formed of an alloy containing at least about 22% cobalt.

19. An alloy article as set forth in claim 17 wherein the carburized case layer contains not more than about 0.25% carbon.

20. An alloy article as set forth in claim 17 wherein the core is formed of an alloy containing not more than about 0.02% carbon.

* * * * *